United States Patent

Hogue et al.

[11] Patent Number: 6,000,942
[45] Date of Patent: Dec. 14, 1999

[54] PARACHUTE FLIGHT TRAINING SIMULATOR

[75] Inventors: Jeffrey R. Hogue, Los Angeles; Fritz G. Anderson, San Luis Obispo; Randal Danta, Tustin; Cecy A. Pelz, Los Angeles; Frank C. Debiasio, Thousand Oaks, all of Calif.

[73] Assignee: Systems Technology, Inc., Hawthorne, Calif.

[21] Appl. No.: 08/928,319

[22] Filed: Sep. 12, 1997

Related U.S. Application Data

[60] Provisional application No. 60/026,238, Sep. 17, 1996.

[51] Int. Cl.$^6$ .................................................. G09B 9/08
[52] U.S. Cl. ............................... 434/30; 434/35; 434/38; 434/43; 434/45
[58] Field of Search ............................... 434/28–30, 35, 434/38, 40, 41, 43–45, 49, 51, 60

[56] References Cited

U.S. PATENT DOCUMENTS

| | | |
|---|---|---|
| 4,016,658 | 4/1977 | Porter et al. . |
| 4,078,317 | 3/1978 | Wheatley et al. . |
| 4,737,107 | 4/1988 | Bories et al. . |
| 5,017,141 | 5/1991 | Reif et al. . |
| 5,252,068 | 10/1993 | Gryder ........................................ 434/30 |
| 5,584,696 | 12/1996 | Walker et al. ............................. 434/43 |
| 5,655,909 | 8/1997 | Kitchen et al. ............................ 434/44 |

*Primary Examiner*—Robert A. Hafer
*Assistant Examiner*—John Edmund Rovnak
*Attorney, Agent, or Firm*—Edward A. Sokolski

[57] ABSTRACT

The experience of parachute flight is simulated including parachute release and malfunctions. The parachutist trainee is suspended in a harness and a control line provided for the parachutist to operate. The parachutist's actions are sensed by an action sensor actuated by the control line. Force and position sensors sense position and force factors effected by the parachutist. The parachutist's head motion can be tracked by a head mounted sensor. The outputs of the sensors are converted to digital signals which are fed to a computer. The computer is programmed with a mathematical and logical model of parachute dynamics and environmental factors. The computational results are displayed to the parachutist on a monitor or on a head mounted display, the scene viewed containing a variety of three dimensional representations of objects on the ground such as buildings vegetation roads, etc. The responses of the parachutist and computed motions of the parachutist are scored continually for activity level and accuracy. The run ends when collision logic detects intersection with other simulated objects, e.g. when the parachutist touches ground in the simulation.

12 Claims, 9 Drawing Sheets

PROGRAM STARTUP FLOW DIAGRAM

FIG. 11A

OPTIONS DURING & AFTER JUMP

FIG. 11B

PARACHUTE FLIGHT TRAINING SIMULATOR

This application claims benefit of provisional application Ser. No. 60/026,238 filed Sep. 17, 1996.

BACKGROUND OF THE INVENTION

1. Field of the Invention

This invention relates to a parachute flight training simulator and more particularly to such a simulator in which the trainee provides input signals to a programmed computer and observes a computerized display simulating his flight.

2. Description of the Related Art

Parachuting simulation systems are described in U.S. Pat. No. 4,737,107 issued Apr. 12, 1988 to Bories et al. and U.S. Pat. No. 4,264,311 issued Apr. 28, 1981 to Call, et al. Both of these systems involve mechanical systems wherein the parachutist is suspended from a frame and mechanically moved in a manner simulating a parachute flight. There is no suggestion of the simulation of a flight by a pictorial display which the parachutist observes and can control his parachute to provide a simulated landing in a desirable spot and in a matter to avoid colliding with other parachutists.

Simulation systems are used extensively for training pilots in flying conventional fixed wing and rotary wing aircraft. In such systems, students are seated in replicas of aircraft cockpits, moving force-loaded controls to simulate flying in response to movement of displayed elements in electronically generated scenes. Flight simulation systems of this type are described in U.S. Pat. No. 4,016,658 issued Apr. 12, 1977 to Porter, et al; U.S. Pat. No. 4,078,317 issued Mar. 14, 1978 to Wheatley, et al; and U.S. Pat. No. 5,017,141 issued May 21, 1991 to Relf, et al. To the best of applicants' knowledge, however, simulation systems having displays which simulate the flight pictorially from beginning to end are not found in the prior art for parachuting flight training.

SUMMARY OF THE INVENTION

The system of the present invention provides a simulated parachute flight in which the parachutist has a video display to watch which shows objects on the ground in three dimensional form as well as other parachutists in the vicinity. The display is controlled by a computer which effects changes in the display as the parachutist "descends" and accounts for action by the parachutist in using controls and shifting of weight to change the path of the parachute.

In one embodiment of the invention, the parachutist is suspended in a harness from a pulley system. The pilot has control toggles. When these toggles are actuated, an electrical signal is generated in response to such movement which is fed to a computer for processing. A separate electrical signal is sent to the computer in response to motion and change of force on the harness riser straps due to body movement by the parachutist.

The computer is programmed to generate control signals in accordance with dynamic flight features, head motions of the parachutist, a simulation of the objects on the ground, and the flights of other parachutists in the vicinity. The output of the computer is fed to a 3-D graphics adapter which generates 3-D control signals from the computer signals, these signals being fed to one or more computer monitors, projectors, or a display mounted on the head of the parachutist for display. A separate output is fed through a standard display adapter to a monitor used by the instructor. The instructor has a keyboard, mouse, and joysticks at his disposal to provide control signals into the computer for varying the flight conditions.

It is therefore an objection of this invention to provide an improved simulation system for training parachutists.

It is a further object of this invention to facilitate the training of parachutists by providing a simulated descent which is displayed on computer monitors, projectors, or a head mounted display in real life form.

Other objects of the invention will become apparent in view of the following description taken in connection with the accompanying drawings.

DESCRIPTION OF THE DRAWINGS

FIG. 2 is a schematic illustration showing a harness and support device which may be employed in supporting the parachutist in the preferred embodiment.

FIG; 5 is a view taken along the plane indicated by 5—5 in FIG. 3; ad

DETAILED DESCRIPTION OF THE INVENTION

Figure 1:
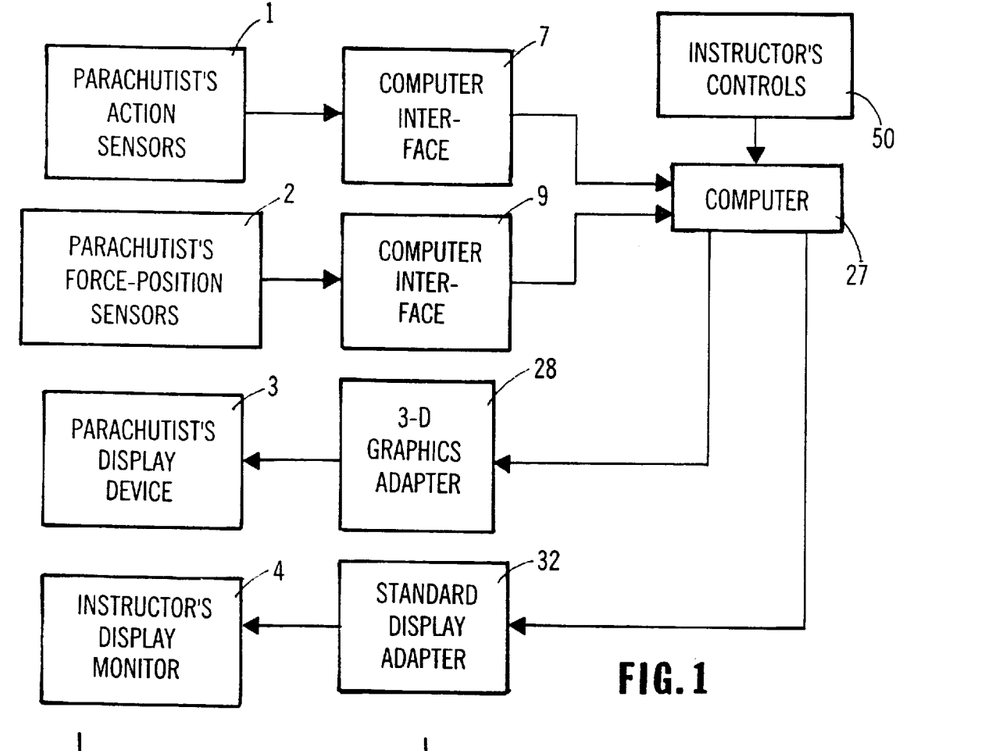
FIG. 1 is a simplified block diagram showing the basic features of a preferred embodiment of the invention.

Referring now to FIG. 1, a simplified block diagram of the preferred embodiment of the invention is shown.

Figures 2, 5:
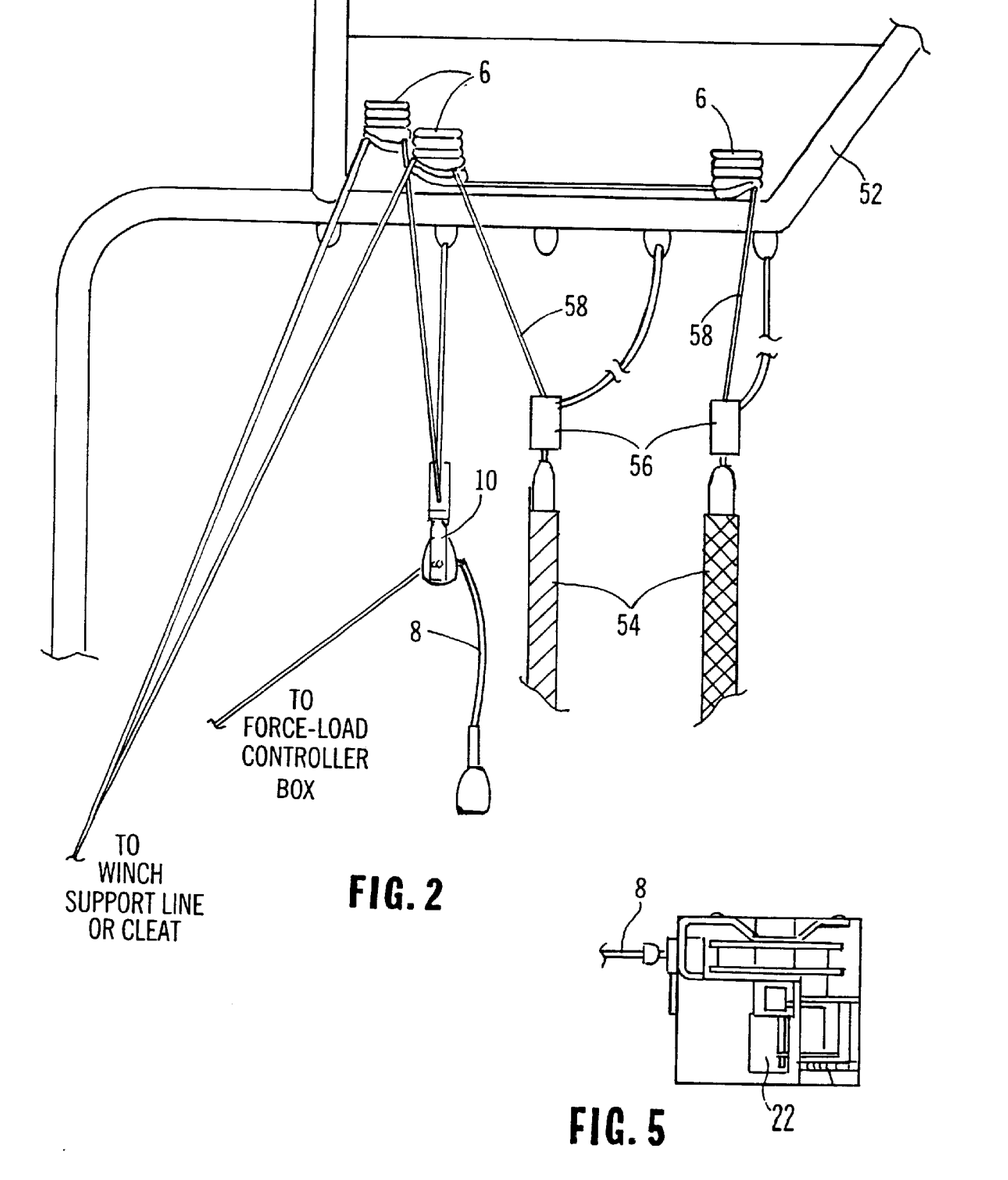

In one embodiment of the invention, the student parachutist wears a harness and is suspended from a support frame 52 by means of a pulley system, as shown in FIG. 2.

A pair of control toggles simulating those in a regular parachute are provided. The action on these control toggles is sensed by Parachutists Action Sensors 1 which provide an electrical signal output in accordance with such action. The output of sensors 1 is fed to computer interface 7, the digital output of which is fed to computer 27.

Body motion of the student parachutist effecting force changes on the harness riser straps, which would affect the movement of a flying parachute, are sensed by Parachutists Force-Position Sensors 2 which provide electrical output signals. These signals are fed to computer 27 through computer interface 9. It is to be noted that the sensors employed may include potentiometers, optical encoders or may have digital outputs so as to obviate the need for an analog-digital converter.

Computer 27 processes the signals it receives and, as to be explained further on in the specification, is programmed to provide signals representing a simulated flight, including simulated scenes such as pictorial representations of the ground (shrubbery, roads buildings, etc.), as well other tutorial aids such as representations of winds and trajectories and simulated flights of other parachutists.

The output of computer 27 is fed to 3-D Graphics Adapter 28 which converts the signals to represent images in 3-D form. Such a 3-D Adapter may comprise a model XL-100 unit available commercially from 3Dfx Interactive Co. The output of the 3-D Graphics Adapter 28 is fed to Parachutists Display Device 3, which provides a pictorial 3-D display to the parachutist, simulating what would appear in an actual parachute descent.

An output from the computer 27 is also provided to Standard Display Adapter 32 where the signals are processed for providing a display on the Instructor's Display Monitor 4. Using this monitor, the instructor can employ the Instructor's Control 50 to enter signals into the computer to modify the flight parameters, as may be desired.

Referring now to FIGS. 2–5, the mechanisms are shown by which signals generated by the student parachutist are processed. It is to be noted that only the mechanisms on one side (in the example, on the rights side of the parachutist) are illustrated, there being mechanisms on the opposite side which are identical.

The parachutist's harness is suspended from support frame 52 by means of riser straps 54. The riser straps are connected to the support frame through support lines 58 and pulleys 6. Force measuring devices such as load cells 56 are placed in series between the riser straps and the support lines. These load cells sense force on the straps and provide electrical output signals in accordance with such force for processing in the computer.

Parachute cord control line 8 simulates the control line of a parachutist in controlling flight. Cord 8 runs through pulley 10 to the controller 24 illustrated in FIGS. 3–5.

Figure 3:
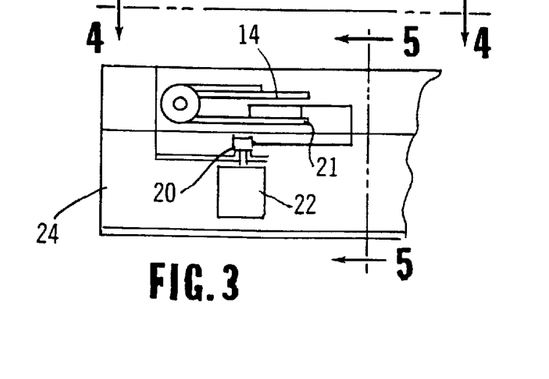
FIG. 3 is a schematic illustration of a force control loader which may be utilized in the preferred embodiment.
Figure 4:
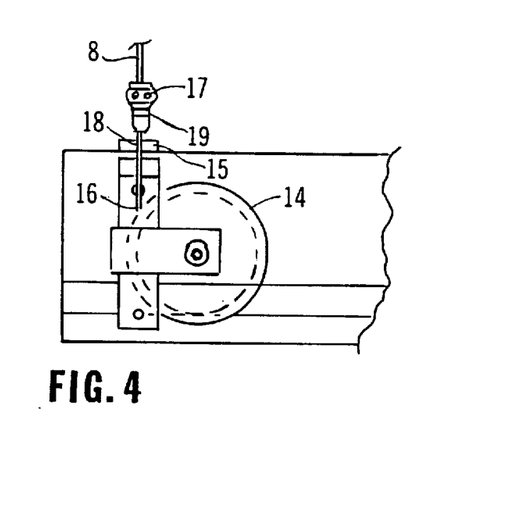
FIG. 4 is a view taken along the plane indicated by 4—4 in FIG. 3.

As can be seen in FIGS. 3–5, cord 8 is fed through guide hole 15 and wrapped around reel 14. Clamp 17, which is attached to cord 8 limits retraction of the cord. Soft stop member 18 and resilient cushion 19 are provided to cushion strong sudden pulls on the cord. Shaft 20 is attached to the flange 21 of the reel and rotates therewith.

The shaft of potentiometer 22 is connected to shaft 20 so as to rotate therewith and provide a resistance variation in accordance with such motion. A reference voltage is applied across the potentiometer to provide an electrical output in accordance with the resistance variation. In lieu of a potentiometer, a digital encoded position sensor or optical encoder may be employed.

Cord 8 is preloaded on reel 14 by spring loading the reel with a coil spring connected between the reel and its casing or by means of a torque motor. The signals from the potentiometer are converted to digital form and fed to the computer for processing.

Figure 6:
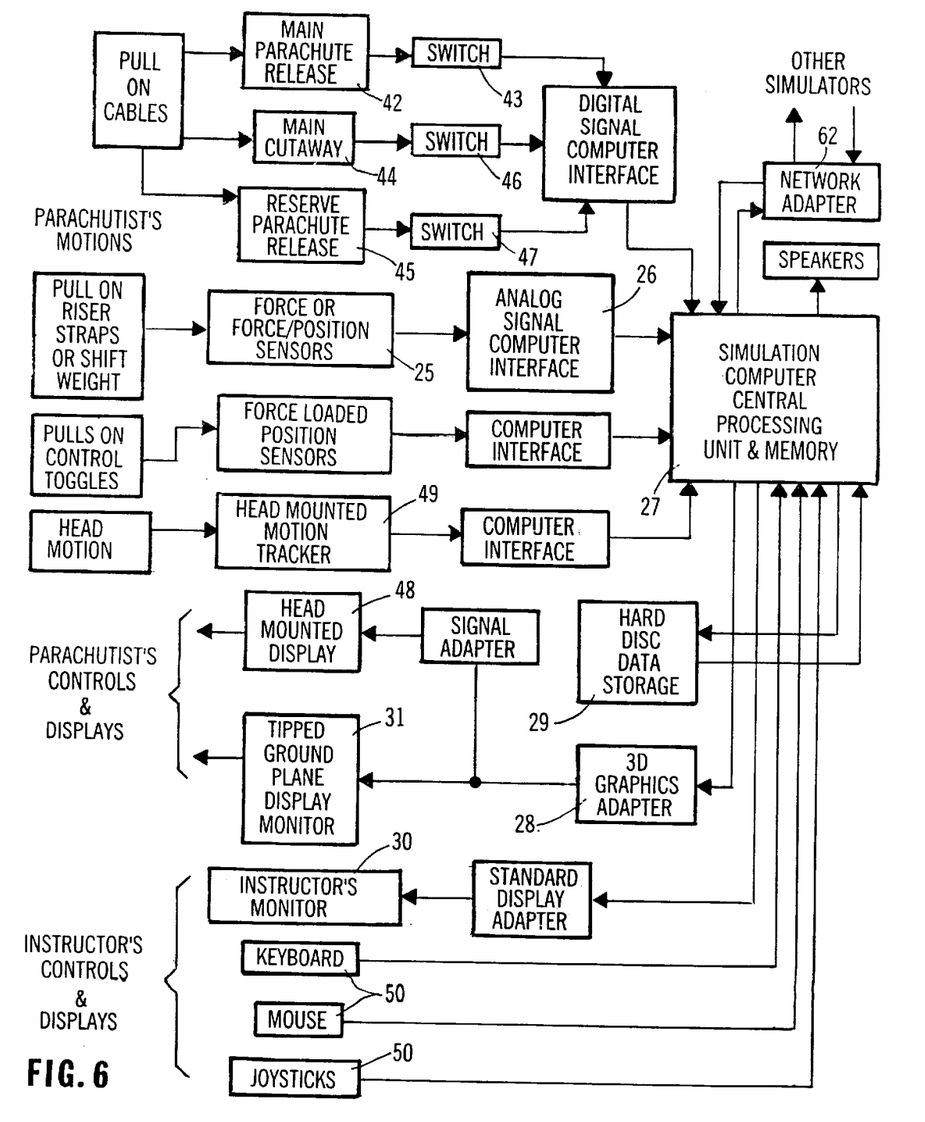
FIG. 6 is a flow chart illustrating the operation of the system of the invention.

Referring now to FIG. 6, a flow diagram showing the operation of the system of the invention is presented. The student parachutist effects release of the main canopy by pulling on the parachute main release handle 42. As the cable connected to the handle is drawn, it trips microswitch 43 simulating the release of the parachute. In lieu of a microswitch, an optical sensor may be employed. If a canopy malfunction is selected in the exercise and the student pulls on the main cutaway control 44 or reserve release control 45, switches 46 and 47 are tripped. If no student malfunction signal is generated, and automatic opening of the parachute has been selected, the system will simulate automatic canopy deployment. The simulated successful opening of the chute or the malfunction failure result is displayed on the video display device as an appropriate canopy simulated motion. The signals from switches 43, 46 and 47 are converted to digital form in the digital signal computer interface and fed to the computer 27.

When the parachutist pulls on the riser straps 54 (See FIG. 2) or shifts weight, this is sensed by force or force/position sensors 25 which provides an output signal in accordance with the input received to analog signal computer interface 26. The signals are converted to digital form in this interface and fed to computer 27. When the student pulls on one or both of the control toggles connected to line 8 (see FIG. 2), this is sensed by force loaded position sensors, converted to digital form in a computer interface and fed to the computer 27. Head motions of the parachutist are sensed by head motion tracker 49, converted to digital forming a computer interface and fed to the computer. Signals to and from other simulators are fed through Network Adapter 62.

A keyboard, mouse and joysticks 50 are provided for the instructor to provide a control input into the computer. With these controls, the instructor can modify the displayed scene, use a cursor pointer to demonstrate to the student and move the effective position of the student's eye point in pitch and yaw when the student is using the tipped ground monitor rather than a head mounted display. When the parachutist is provided with a fixed monitor display of the simulated scene, the scene can be optionally oriented by the instructor using the joystick or using logic which supplies tips in pitch and roll as a function of attitude; as biases towards the target area with boot symbols displayed on the monitor moving to indicate the down direction and changing color or to outline at the edge of the screen if their computed location would be off screen. A joystick can also be used by the instructor during a playback of a previous jump to move the student's eye point around center while decreasing or increasing the distance from the jumper at the same time as the parachute is extracted.

Display outputs are fed from the computer to a 3-D Graphics display adapter where 3-D video display signals are generated. These signals are fed to two monitors one or the other of which the student parachutist uses. One of these is a tipped ground plane display monitor 31 and the other is a head mounted display monitor 48. The head mounted display monitor is capable of sensing the view at three head rotation angles which has the advantage of affording a view of simulated canopy malfunctions overhead and other jumpers normally out of view in a normal video display. A standard display is fed to the instructor's monitor 30.

Hard disk data storage 29 is provided for the computer. Speakers are provide to provide sound simulation for the parachute jump generated in the computer. A network adapter is also provided to permit the coupling of other simulators into the system.

Figure 7:
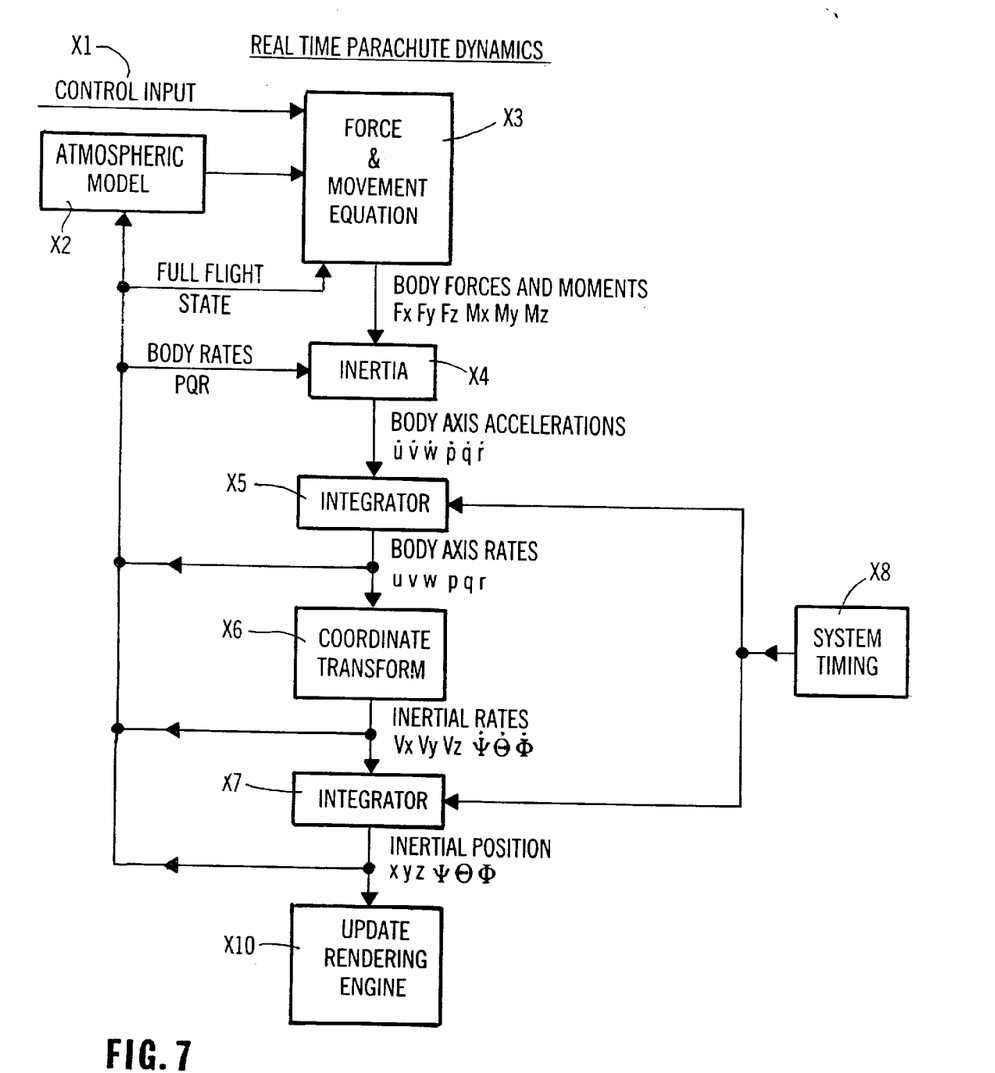
FIG. 7 is a flow diagram illustrating the real time parachute dynamics of the system of the invention.

Referring now to FIG. 7, a flow chart is shown which illustrates the real time parachute dynamics of the system of the invention, as programmed into the computer.

One core element of the real time simulation is the parachute dynamics loop. The functions that comprise this loop are executed once for each frame of graphics, typically 30 or 60 Hz. The contents of this code is shown graphically in FIG. 7. There are three main inputs required for the dynamics code, i.e. control inputs, X1; atmospheric conditions, X2; and current parachute state. The control inputs are the states of the toggle lines and parachute instrumentation.

The atmospheric conditions of concern are the wind and gust velocities in three dimensions as well as the air density.

These parameters are stored in a volumetric table look-up that is queried with the current position of the parachute. The parachute flight state contains information required to calculate forces and moments on the parachute. Important quantities include body axis velocities, u, v, and w, body axis rates p, q, and r, and body orientation alpha and beta. These flight state parameters are the outputs of the previous iteration of the dynamics loop.

The force and moment equations, X3 use the three sets of inputs and user chosen parachute model to determine the parachute's applied forces, Fx, Fy, and Fz and moments, Mx, My, and Mz. Once the force and moments have been determined, the body axis linear and angular accelerations can be calculated from well known rigid body equations of motion. These equations relate accelerations to inertia values, X4 and body axis inertial rates The resulting body axis linear accelerations, u-dot, v-dot, and w-dot and angular accelerations, p-dot, q-dot, and r-dot are then numerically integrated (X5) to yield the body axis rates, u, v, w, p, q, and r.

The real time numerical integrator derives its time step value by subtracting the current system time from the system time at the previous iteration. This time is accurate to one clock cycle of the computer clock (typically 6 nanoseconds). The body axis rates are then transformed via a well known coordinate transform, X6 into the inertial rates Vx, Vy, Vz, psi-dot, theta-dot, and phi-dot. These rates are then numerically integrated, X7 to yield the parachute position and orientation in inertial space. The rendering engine, X10 uses this position to place the parachutist's eye point in the virtual scene. The dynamics loop uses this position and the values from which it is calculated as an input for the next iteration.

Figure 8:
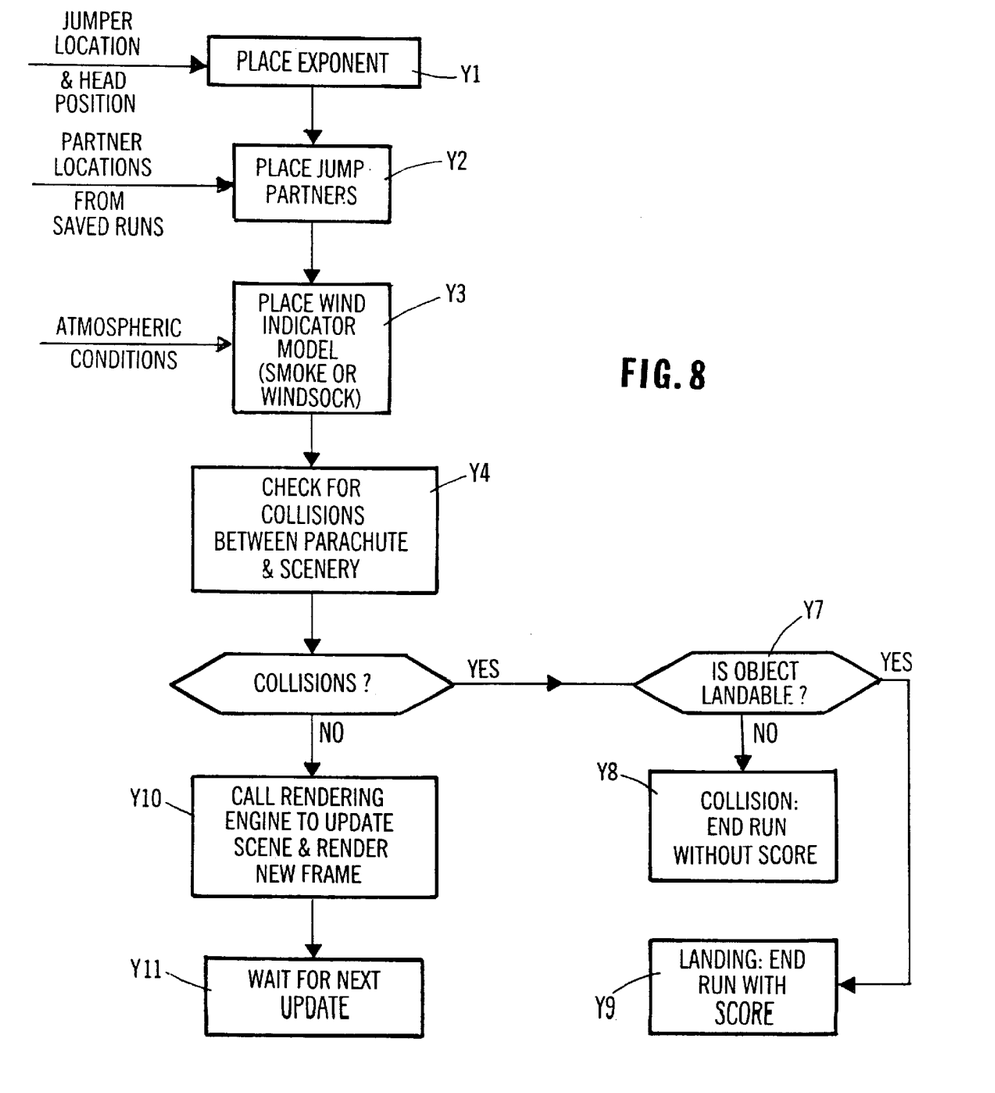
FIG. 8 is a flow diagram illustrating the real time rendering loop of the system of the invention.

Referring now to FIG. 8, a flow chart illustrating the real time rendering loop of the system of the invention is shown.

A second core feature of the parachute maneuvering simulator of the system of the invention is the scene displayed to the parachutist jumper. Perspective transformation computations convert a virtual scene populated with three dimensional models into two dimensional polygons that are then displayed by the hardware graphics card. This can be achieved, for example, by using equations available in a standard 3-D graphics textbook. FIG. 8 illustrates the function of the code used to drive this rendering engine.

The jumper's location and head orientation are used to place the renderer's virtual eye point (Y1). The location is determined as a result of the dynamics calculations and the head orientation is the output of the head tracking system. Based on the user's preference, this head tracker could either be a head mounted sensor, a joystick simulating head motion, or automated logic that moves the parachutist's virtual head in an attempt to keep the landing site in view. Once the eye point has been determined, the jump partners model locations are updated (Y2) if the jump includes partners. The partners positions are determined by saved information from other jumper trainees (Y5) or network simultaneous jumper trainees. Next the scene's Wind indicator is articulated (Y3) based on the current atmospheric conditions at the landing site. These conditions (Y6) are calculated by the dynamics loop.

Once the positions of the jumper, his jump partners, and the wind indicator are updated, collision detection (Y4) is performed. The position and extent of the jumper model is compared with all other models in the scene. If an intersection has occurred then a determination must be made is the intersected object was landable upon (as in the case of the ground or a flat building roof) or not (as in the case of a tree or building side or peaked rooftop). If the object was landable upon, the run is ended and a score given for the overall jump. If the object was not landable upon, the run is ended and the jumper is informed that a collision has taken place. If no intersections occur at all, then the rendering engine is called to update the scene and render a new frame of graphics (Y10). Once called, the rendering engine fills the hardware frame buffer, displays it, and waits for the next update (Y11).

Figure 9:
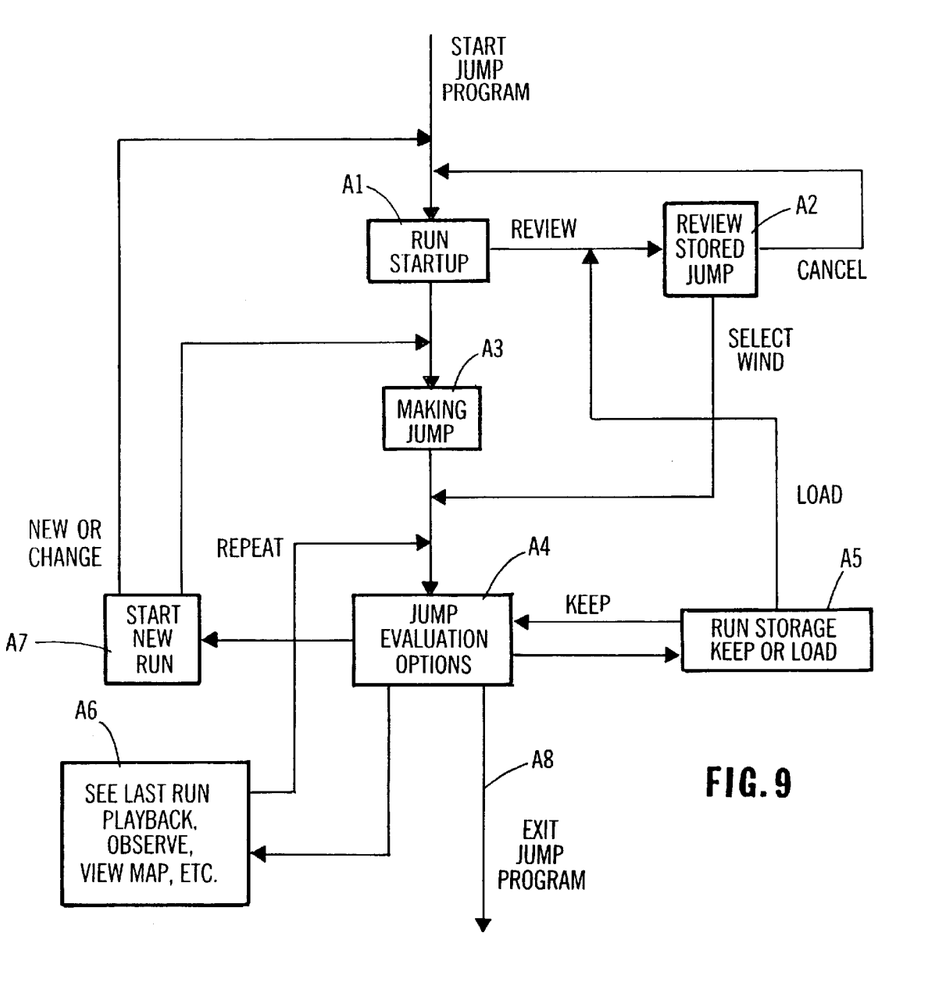
FIG. 9 is an overall flow diagram of the system of the invention.

Referring now to FIG. 9, a flow chart is shown which illustrates the overall operational program flow logic of the system of the invention.

At the start of the program, the instructor must choose from a number of options (A1), including one of loading a previously stored run (A2). If a new run is chosen, the instructor then makes a number of run startup choices (A1). Once this has been done, the instructor can start the jumper on a simulated parachute jump for training, practice, rehearsal, or entertainment (A3). During the run, the instructor can change a number of training display options, pause or terminate the run. After the run, the instructor has a number of jump evaluation options, including using the computer's run storage to keep or load runs (A5), see the run from a number of different perspectives (A6), see and print out maps, start a new run (A7), or end the program.

Figure 10:
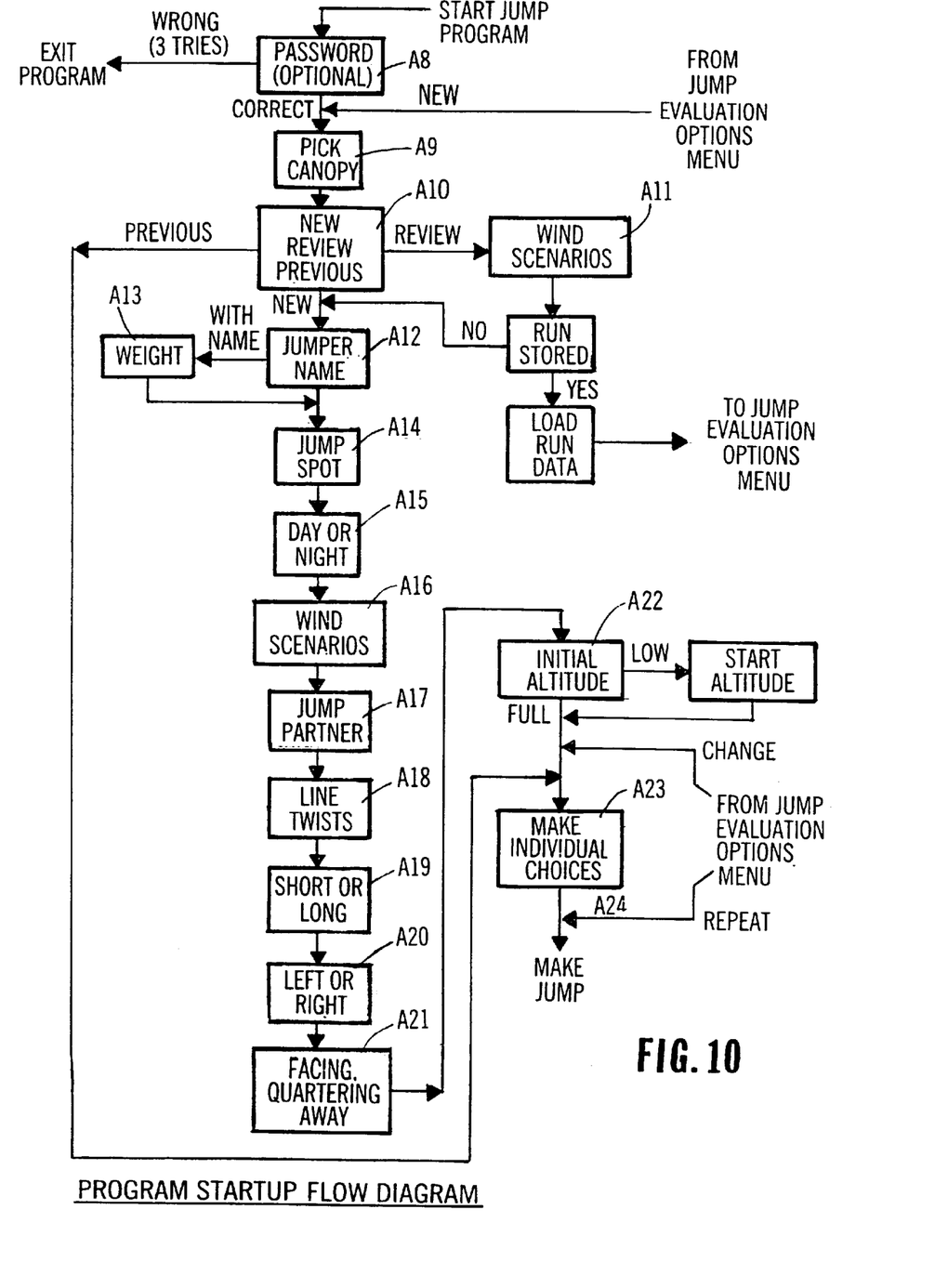
FIG. 10 is a flow diagram illustrating program startup in the system of the invention.

Referring now to FIG. 10, a flow diagram is shown illustrating the start logic flow of the system of the invention. This program can optionally be configured to require a password (A8). Next, the instructor chooses a particular parachute to be simulated (A9). The next choice is whether to make a new run, review any previously recorded runs, or use any previous settings in making a new run (A10). If a new run is to be reviewed, this is organized by wind scenarios (A11).

The jumpers name (A12) and weight (A13) can be entered, followed by the location of the individual target location (A14), time of day (A15), individual three dimensional wind scenarios (A16), previously stored jump partners (A17), malfunctions such as line twists (A18), and canopy opening location. These opening locations are specified relative to he ideal for a particular wind scenario in parachutist terms, i.e. long or short (A18), left or right (A20), direction (A21), initial altitude (A22) followed by a chance to change any individual choices (A23).

Figure 11A:
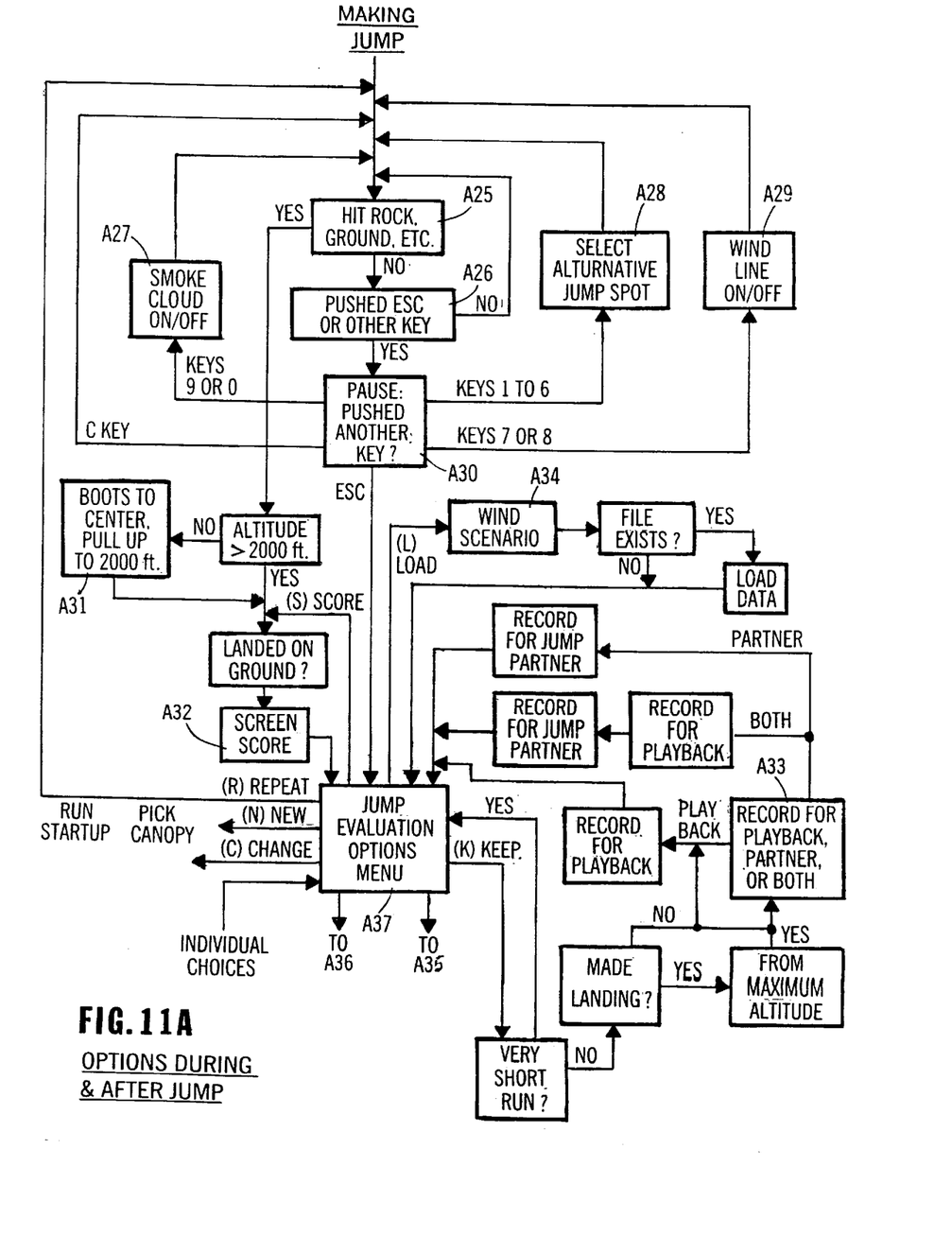
FIGS. 11A and 11B are flow diagrams illustrating options available in the system of the invention during and after the parachutist's jump.
Figure 11B:
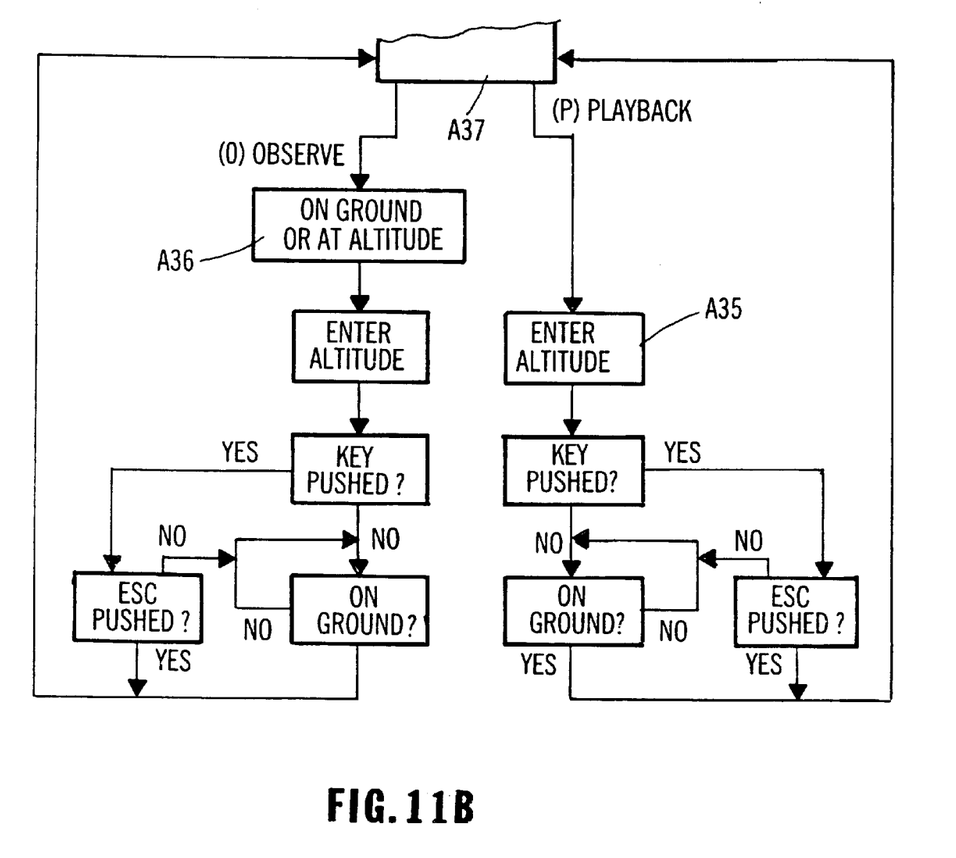

Referring now to FIGS. 11A and 11B, a functional block diagram is shown illustrating options available in the system of the invention during and after the jump has been made.

Before a run actually starts, an overhead map view may be displayed and the run can be started with a final initial choice. The program continually checks via collision logic (A25) to see if the jumper has contacted another object including the ground. It also checks to see if the instructor has pushed a key (escape key) to halt the run (A26) or change the various display options such as a smoke cloud or wind sock (A27), alternative jump spot (A28), or wind line (A29). If a second escape key is pushed, the run ends (A30). For other keys, the appropriate display change occurs, and the run continues. Throughout the run, the program monitors control activity and parachute motion and displays an indication to the jumper of excessive control activity. At the end of a run occasioned by a collision or touchdown, the point of view rotates to directly down, with boot outlines displayed at the center of the screen (A31), and the point of view pulls up to show landing location. If the jumper has succeeded in landing, a score screen appears (A32) showing the automatic scoring during a run and a score based on preset limit values for velocities at touchdown, as well as landing accuracy.

At the end of the run, the instructor can choose to store the run for playback (A33), for display as jumped, for use as a jump partner, or a run can be loaded from storage. The Jump Evaluation Menu (A37) provides inputs to "Enter Attitude" (A35) and "On Ground or at Altitude" (A36). The performance during the run can be displayed from the parachutist's perspective, from overhead in a map like view, from a location determined by a joystick, or in a variety or different map views which can be printed. The instructor can then choose to start a new run or exit the program.

In order to provide the appearance of realistic three-dimensional trees in the scenarios, while maintaining the low polygon count required for rendering efficiency and real-time performance, simplified geometric structures with applied foliage images are used. This approach is commonly used in three-dimensional graphics projects, with the structures in the form of two vertically oriented rectangular models intersecting at right angles. The novel aspect of the models used in this device is that they are comprised of both vertical and horizontal cross-sectional images applied to the appropriate planes. This approach provides a realistic view of the trees from above, as a descending parachutist would actually see them. In most other devices, such models are viewed only from eye level; if other view points are required, a full geometry is needed. The cross-sectional approach provides a realistic model from all view points while avoiding the high polygon count models required by full geometry trees. Additional 3-dimension appearance is provided by associating a bit map shadow with the object. The separate shadow object is not checked by the collision logic.

A problem inherent in may realistic 3-dimensional graphics models is that of texture scale. Since most applications view scenarios from a limited range of distance, the common answer to the problem of ground texture is to select a compromise value; that is a texture scaled to be seen from the most frequently used view point. Naturally, if the view point moves closer to the model, the texture will appear too large and may even dissolve into its component pixels. In the opposite case, if the viewpoint moves farther from the object, fine textures will not be visible and may blur into a general color or was of colors.

For the parachute simulation, a single compromise would not serve. As the user initially views the scenario from a height of up to several thousand feet, the ground texture must be scaled up for correct appearance from these heights. However, during the duration of a run, the parachutist falls towards the ground, with the ground texture becoming relatively larger and larger in appearance. For a ground surface to have the correct appearance at the beginning and throughout most of the run, the texture had to be scaled to a point where, when the user actually landed at the end of the run, the ground surface appeared to be a multicolored patchwork quilt of pixels.

To avoid this problem, the ground was modeled in two layers. The overall ground model was covered by a texture map giving the appropriate appearance from the beginning of the run. A second layer was created to cover the drop zone. This layer was textured with a fine scale alpha channeled surface grass map (for the forest and urban scenarios) or water map (for the ocean scenario). As they include alpha channels, these finely textured surfaces are partially transparent, permitting the underlying surface color to show through. At the end of a simulation run, on approach landing, the user is suddenly able to distinguish the landing surface itself as grass or other appropriate material. This provides a valuable microtexture ground rush visual landing cue.

While the invention has been described and illustrated in detail it is to be understand that this is intended by way of illustration and example only, the scope of the invention being limited only by the terms of the following claims.

We claim:

1. A parachute flight training system for use in training a parachutist by simulating a parachute flight by said parachutist comprising:

control cords simulating the control lines used by a parachutist in controlling flight;

sensor means for sensing the actions of said parachutist during said flight, said actions including the action exerted by said parachutist on said control cords;

a computer responsive to the output of said sensor means for generating a set of signals representing the flight of said parachutist as affected by said actions and surrounding factors programmed into said computer; and display means responsive to the output of said computer for displaying a view of the parachutist's flight including environment factors, simulated objects on the ground, and the flights of other parachutists.

2. The system of claim 1 wherein said parachutist is suspended in a parachutist harness supported by straps, said sensor means including means for sensing the forces exerted by the parachutist on said harness straps.

3. The system of claim 1 wherein said computer is programmed to generate signals therein representing said environmental factors, said objects on the ground and the flight of the other parachutists.

4. The system of claim 1 wherein said display means is adapted to present a three dimensional display.

5. The system of claim 1 and further including means for manually controlling the signals generated by said computer.

6. The system of claim 1 wherein said display means includes a display and tracker mounted on the head of the parachutist.

7. A parachute flight training system for use in training a parachutist by simulating a parachute flight by said parachutist comprising:

a harness and pulley system for suspending said parachutist in a manner simulating such suspension during actual flight, said harness and pulley system having a pull cord and a line extending from said pull cord and riser straps extending from said harness;

a reel around which said line extending from the pull cord is wound, a sensor having a rotatable shaft connected to said reel, the output of said sensor varying with the motion of said reel, load sensor means attached to said riser straps for generating an electrical signal in accordance with the force on said riser straps;

a computer connected to receive the varying output of said sensor and the output of said load sensor means, said computer generating an output in accordance with the voltage output of said load sensor means and the output of said sensor which varies with the motion of the reel;

said computer being programmed to generate an output signal representing objects on the ground, environmental conditions, and the flights of other parachutists;

a display monitor which receives the outputs of said computer and provides a three dimensional view of the flight of said parachutist including the travel of the parachutist, objects on the ground and the flights of other parachutists; and means for providing a manually generated input to said computer to vary the display on said display monitor.

8. The system of claim 7 wherein said sensor comprises a potentiometer.

9. The system of claim 7 and additionally including a main release handle, a main cutaway control and a reserve release control and switch means responsive to the actuation of said main release handle, said main cutaway control and said reserve release control for providing signals to the system in accordance with such actuation.

10. A parachute flight training system for use in training a parachutist by simulating a parachute flight by said parachutist, said parachutist being suspended from a harness by means of riser straps and including a pulley system, said training system comprising:

sensor means for sensing the actions of said parachutist during said flight, said sensor means including means for sensing the force exerted by said parachutist on said riser straps and on the pulley system, said pulley system including a reel and a pull cord control drive connected to said reel, said sensor means further including means having a shaft connected to said reel to provide an output in accordance with motion of said reel;

a computer responsive to the output of said sensor means for generating a set of signals representing the flight of the parachutist as affected by said actions and surrounding factors programmed into said computer; and display means responsive to the output of said computer for displaying a view of the parachutist's flight including environmental factors, simulated objects on the ground, and the flights of other parachutists.

11. The system of claim 1 and further including means for preloading the control cords.

12. The system of claim 1 wherein said display means further includes a display device mounted on the head of the parachutist.

* * * * *